United States Patent [19]

Sasamura

[11] Patent Number: 4,717,002
[45] Date of Patent: Jan. 5, 1988

[54] UNIVERSAL POWER ASSIST ARRANGEMENT FOR USE WITH A VEHICLE TRANSMISSION CLUTCH LINKAGE

[75] Inventor: Ross Sasamura, Fremont, Calif.
[73] Assignee: Paccar, Inc., Bellevue, Wash.
[21] Appl. No.: 803,434
[22] Filed: Dec. 2, 1985
[51] Int. Cl.$^4$ .................. F16D 23/12; F16K 31/44
[52] U.S. Cl. .................. 192/99 S; 192/70.24; 192/91 R; 251/279
[58] Field of Search .......... 192/99 S, 85 R, 91 A, 192/91 R, 3.58, 70.24; 251/279, 215

[56] References Cited

U.S. PATENT DOCUMENTS

| | | | |
|---|---|---|---|
| 2,934,041 | 4/1960 | Ayers, Jr. | 251/279 |
| 3,908,514 | 9/1975 | Rist | 251/279 |
| 4,114,743 | 9/1978 | Sink et al. | 192/91 R |
| 4,290,507 | 9/1981 | Brown | 192/70.24 X |
| 4,305,568 | 12/1981 | Adachi et al. | 251/279 |
| 4,393,907 | 7/1983 | Kronstadt | 192/99 S |
| 4,516,669 | 5/1985 | Boström | 192/3.58 |

Primary Examiner—William F. Pate, III
Assistant Examiner—Richard E. Chilcot, Jr.
Attorney, Agent, or Firm—Flehr, Hohbach, Test, Albritton & Herbert

[57] ABSTRACT

A vehicle of the type having a manual transmission is disclosed herein. The manual transmission includes a clutch, a clutch pedal and a linkage assembly interconnecting the clutch with the pedal and requires that the driver of the vehicle depress the clutch pedal in order to disengage the clutch. There is also disclosed herein an arrangement for assisting the driver in disengaging the clutch when the clutch pedal is depressed. This arrangement includes a power assist device, a source of power for driving the device, and a valve assembly including a valve and mounting components interconnecting the valve with the transmission's linkage assembly such that the manual depression of the pedal by the driver automatically acts on the valve to cause the latter to connect the power assist device to its source of power in order to drive the device and therefore aid the driver in disengaging the clutch.

1 Claim, 10 Drawing Figures

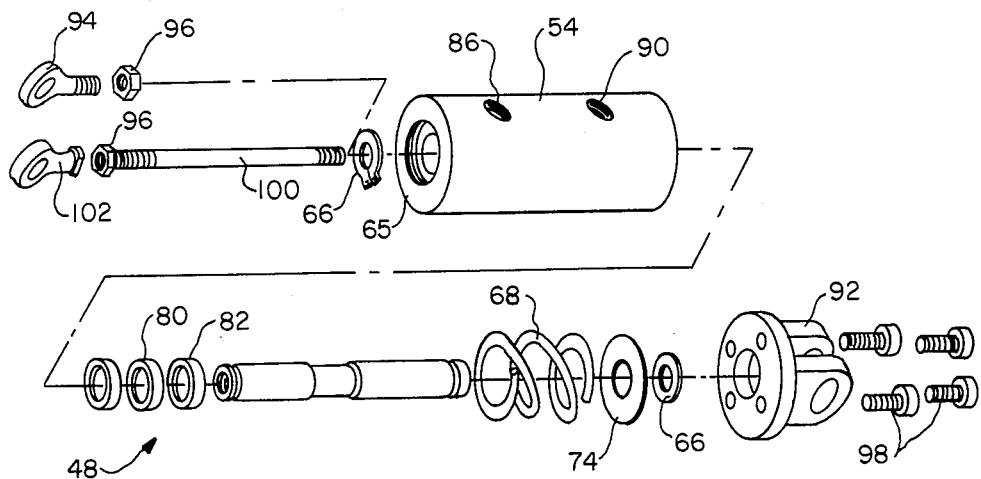
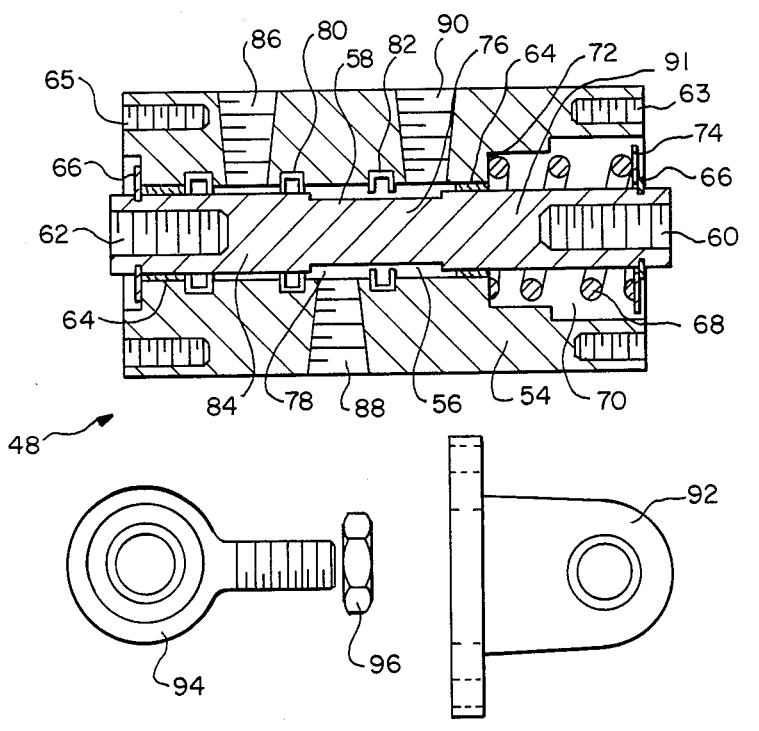
FIG.-5
FIG.-6

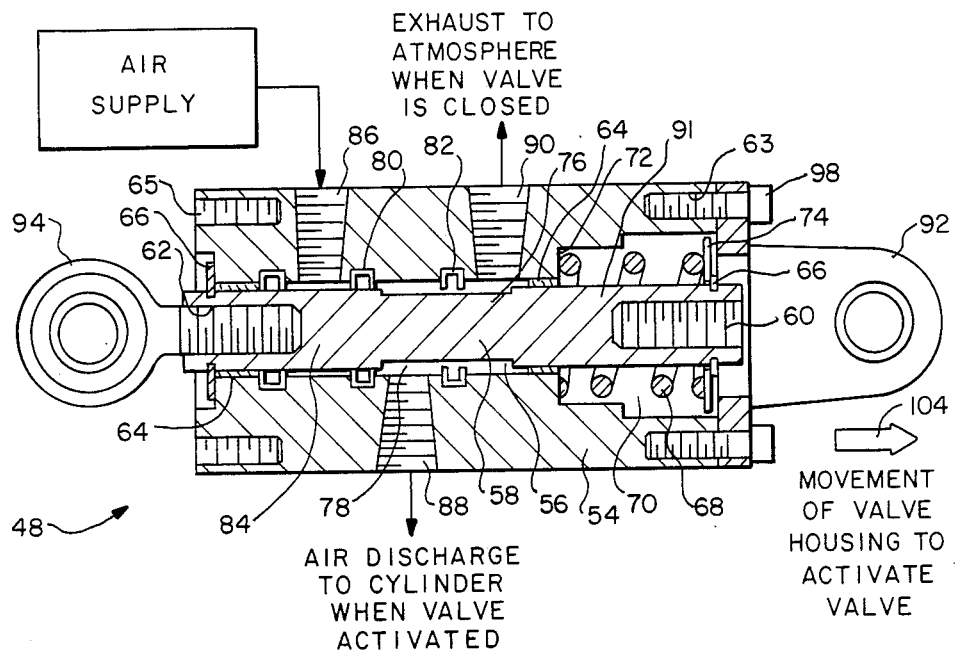
FIG. —7
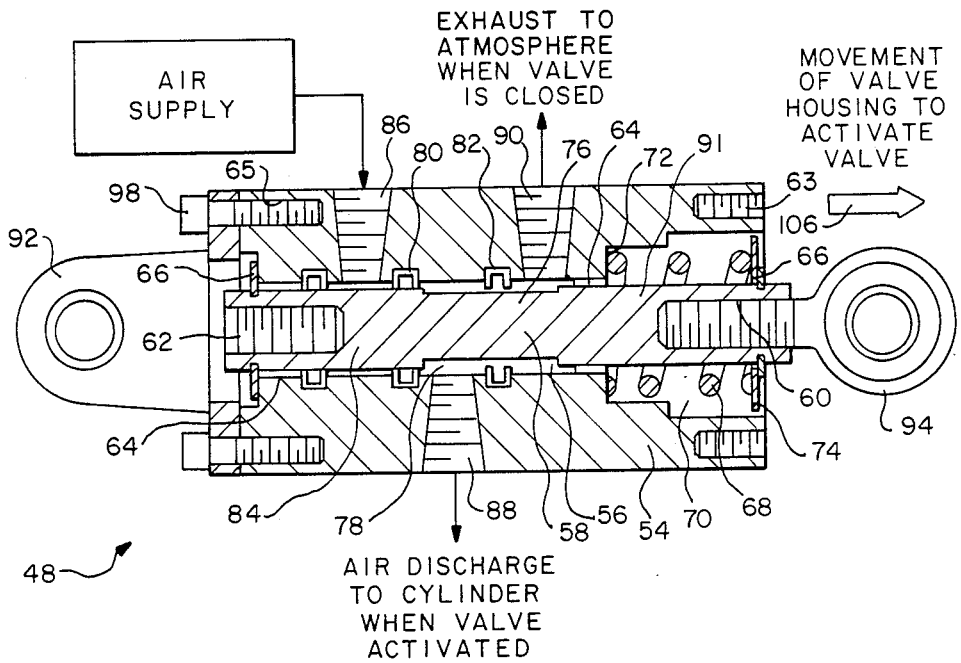
FIG. —8

UNIVERSAL POWER ASSIST ARRANGEMENT FOR USE WITH A VEHICLE TRANSMISSION CLUTCH LINKAGE

The present application relates generally to vehicles of the type having manual transmissions and more particularly to a heavy duty vehicle having a manual transmission whcih requires that the driver apply a greater force to its clutch pedal in order to disengage the transmissions's clutch than is required by the transmission in a typical passenger car.

A typical manual transmission for a vehicle is illustrated in FIG. 1. This transmission, which is generally indicated by the reference numeral 10, includes a clutch housing 12 containing a clutch (not shown), a clutch pedal 14 and a linkage assembly generally indicated at 16 interconnecting the clutch with the pedal. The linkage assembly itself includes a clutch release lever 18 connected with a clutch release bearing which ultimately connects with the clutch and movable between a clutch engaging position and a clutch disengaging position, pedal support linkage 20 supporting pedal 14 and a link 22 linking together clutch release lever 18 and pedal support linkage 20. A clutch lever return spring 24 connects the clutch release lever to a fixed reference point 26 in order to bias the lever in its clutch engaging position.

For the reasons to become apparent below, it is important to note that the linkage assembly forming part of overall transmission 10 (actually the link 22) is placed in tension during disengagement of clutch 12. Note specifically that as the clutch pedal 14 is depressed, as indicated by arrow 30, the lower most end of linkage 20 moves away from the clutch housing 12 pulling link 22 with it while, at the same time, return spring 24 pulls on the link 22 in the opposite direction. As a result, link 22 is placed in tension, as diagrammatically represented by the two way arrow 34.

In contrast to the arrangement just described, FIG. 2 illustrates the same manual transmission 10 and clutch housing 12, but a modified clutch pedal 14' and a modified linkage assembly 16' which places its link 22' in compression rather than tension. Linkage assembly 16' includes a clutch release lever 18' corresponding to lever 18, pedal support linkage 20' corresponding to support linkage 20, and the interconnecting link 22' just mentioned which corresponds to link 22. The clutch release lever is biased in its engaging position by means of a clutch lever return spring 24' connected at one end to the lever and at its other end to a fixed point 26'. Note that when the pedal 14' is depressed, as indicated by arrow 30', the lowermost end of pedal support linkage 20' moves towards clutch housing 12, as indicated by arrow 32', thereby pushing on link 22', in the same direction. At the same time, clutch lever 18', as a result of return spring 24' applies a force on the opposite end of link 22' in the direction of pedal support linkage 20'. In other words, the link 22' is placed in compression, as diagrammatically represented by the confronting arrows 34'.

Both of the transmission embodiments just described are typical in the prior art. For reasons which will become apparent hereinafter, it is important to keep this in mind. However, which ever embodiment is used in a heavy duty truck, the force required to depress the clutch pedal is often much greater than that required in typical passenger cars, as stated above. In an attempt to reduce driver fatigue and facilitate the operation of heavy duty trucks, devices have been made available for reducing the pedal depression force required by a driver, as installed either by the original equipment manufacturer or by the repair shops through aftermarket parts dealers. The most common clutch assist devices utilize a pressurized air system found in heavy duty trucks to drive a cylinder which suppplements the driver's force to disengage the clutch. The cylinder receives its supply of pressurized air through a control valve which regulates the air in direct proportion to the force exerted on the clutch pedal by the driver. In order to properly time the assistance provided by the air cylinder, the valve must sense the build up of force on the clutch pedal and provide air to the cylinder in direct proportion to the clutch pedal force. The proper sensitivity of the air valve is obtained by incorporating the valve into the clutch linkage where it is directly in line to receive the force transmitted to disengage the clutch. Splicing the valve into the clutch linkage also assures the capability to operate the clutch in a manual mode should an assist component become inoperative.

As described above with respect to FIGS. 1 and 2, the typical clutch mechanism linkage assembly may be placed either in tension or compression when the clutch disengagement force is applied. Therefore, if the control valve described immediately above is to be placed into the linkage assembly, it must be designed to accommodate either of these two modes, that is, a tension linkage mode or a compression linkage mode. The valves made available heretofore have either been designed for one mode or the other, but not both. In other words, to date no one to applicant's knowledge has provided a universal valve for air assist clutch devices to be used in either a tension or compression mode without substantial modification.

In view of the foregoing, it is a primary object of the present invention to provide a control valve generally of the last mentioned type which is capable of operating in either a tension mode or a compression mode.

A more particular object of the present invention is to provide an overall power assist arrangement of the general type described above including a linkage assembly which may be in either tension or compression and a valve assembly including a valve and valve mounting components for connecting the valve into the linkage assembly such that the same valve and valve mounting components can be used whether the linkage assembly is in tension or compression.

As indicated above, the present invention is directed to a vehicle of the type having a manual transmission which includes a clutch, a clutch pedal, and a linkage assembly interconnecting the clutch with the pedal and which requires that the driver depress the clutch pedal in order to disengage the clutch. The present invention is directed to an arrangement for use in this vehicle, specifically an arrangement for assisting the driver in disengaging the clutch when the clutch pedal is depressed. This arrangement includes power assist means connected with the linkage assembly and responsive to a source of power for producing a force on the linkage assembly which aids in disengaging the clutch from an engaged condition. The arrangement also includes power actuating means including the source of power just mentioned, a valve, and valve mounting components interconnecting the valve with the linkage assembly such that the manual depression of the pedal by the driver automatically acts on the valve to cause the latter to connect the source of power to the power assist means for causing the power assist means to apply the above-mentioned force to the linkage assembly simultaneously with the manual depression of the pedal, whereby the force aids the driver of the vehicle in disengaging the clutch pedal. In accordance with the present invention, the valve and valve mounting components are configured such that they are able to form part of the power actuating means whether the linkage assembly interconnecting the vehicle's clutch with the pedal is placed in tension or compression.

The overall arrangement just described briefly will be described in more detail hereinafter in conjunction with the drawings wherein:

FIG. 5 is an exploded perspective view of a valve forming part of an overall power assist arrangement designed in accordance with the present invention;

FIG. 6 is an exploded view, in part in axial sectional, of the valve of FIG. 5;

FIG. 7 is an axial sectional view of an assembled valve of FIG. 6 shown in a tension operating mode;

FIG. 8 is a similar view to FIG. 7 but showing the valve in a compression operating mode.

Figure 1:
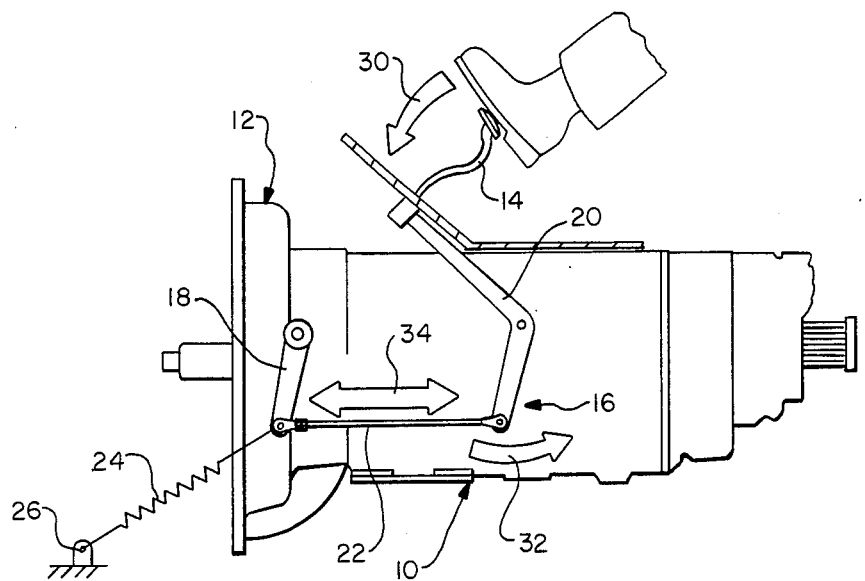
FIGS. 1 and 2 are diagrammatic illustrations of manual transmissions designed in accordance with the prior art, in both tension and compression mode, respectively.
Figure 2:
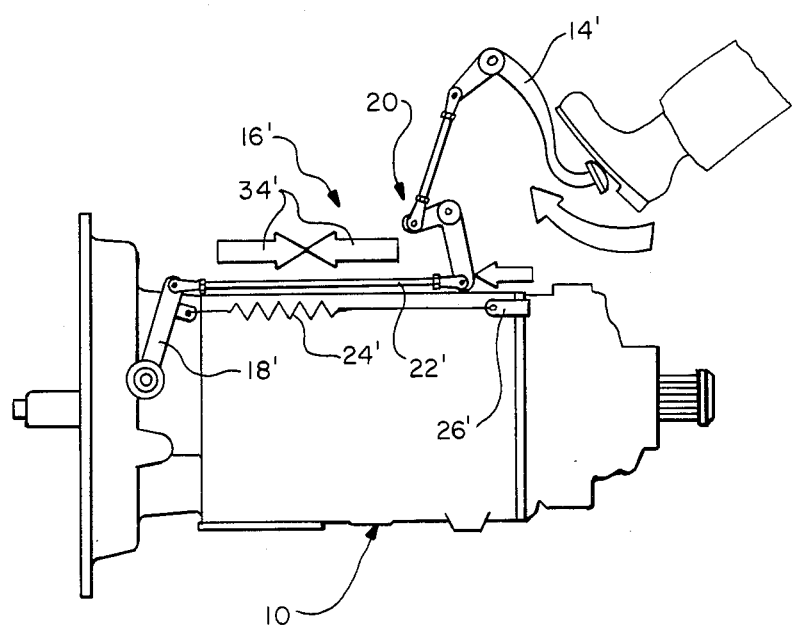
Figure 3:
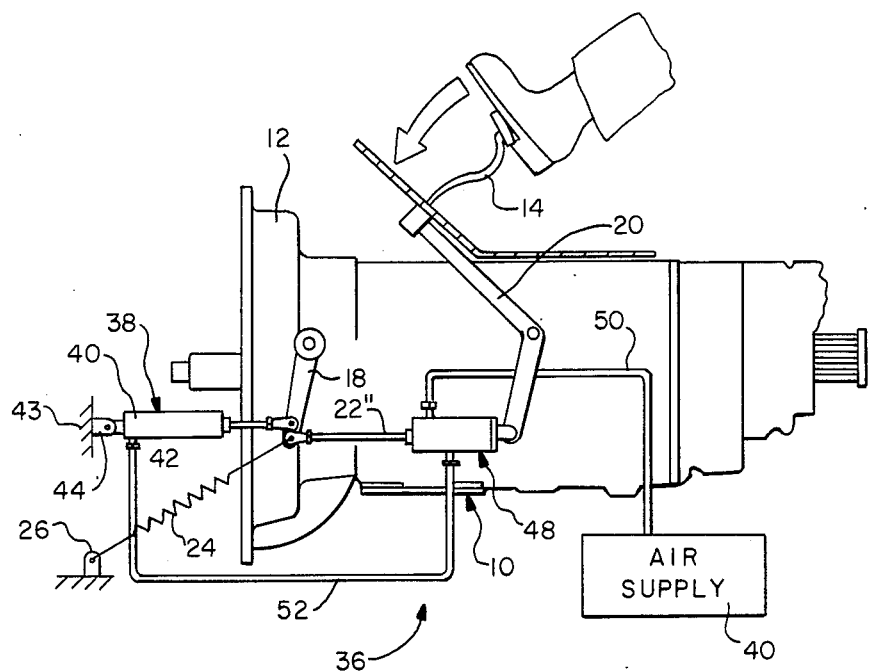
FIGS. 3 and 4 are diagrammatic illustrations of the transmission systems illustrated in FIGS. 1 and 2, respectively, but modified to incorporate the present invention.
Figure 4:
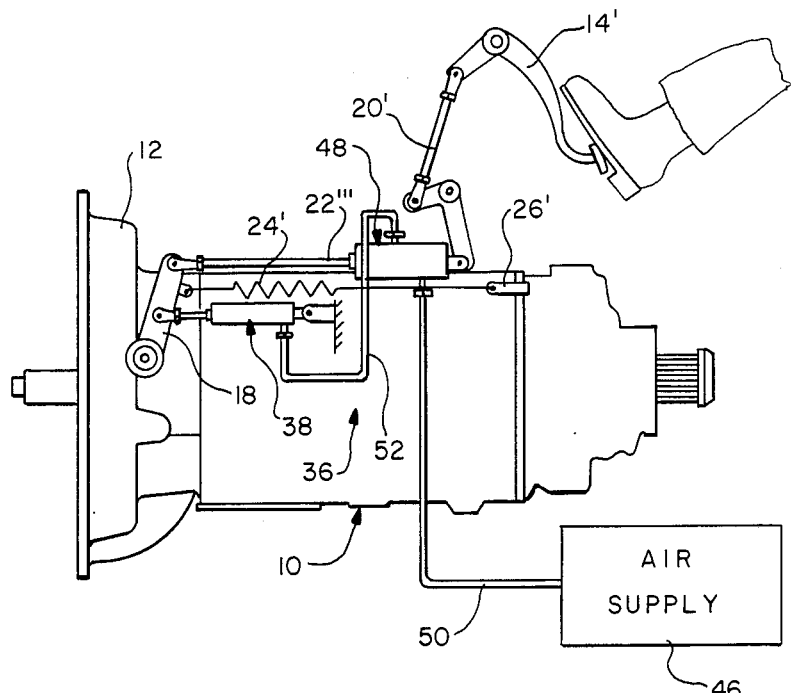

Turning now to the drawings, wherein like components are designated by like reference numerals throughout the various figures, attention is immediately directed to FIGS. 3 and 4, in as much as FIGS. 1 and 2 were discussed above. FIGS. 3 and 4 illustrate the same transmission 10 and clutch housing 12 shown in FIGS. 1 and 2. In addition, in FIG. 3, the same clutch pedal 14, clutch release lever 18, pedal support linkage 20, and clutch lever return spring 24 as illustrated in FIG. 1 are used. The embodiment in FIG. 4 uses clutch pedal 14', clutch release lever 18', pedal support linkage 20', and clutch lever return spring 24' forming part of the embodiment illustrated in FIG. 2. In addition, both the FIG. 3 and FIG. 4 embodiments utilize modified links 22" and 22"' corresponding to links 22 and 22', respectively.

As illustrated in FIGS. 3 and 4, clutch lever 18 of the FIG. 3 embodiment is connected with clutch lever return spring 24 and one end of link 22" in the same manner shown in the FIG. 1 embodiment while the clutch release lever 18' is connected with spring 24' and one end of link 22"' in the same manner as illustrated in the FIG. 2 embodiment. In addition, the springs 24 and 24' in the FIGS. 3 and 4 embodiments are also connected to fixed points 26 and 26', as in the FIGS. 1 and 2 embodiments. Further, the clutch pedals 14 and 14' in the FIGS. 3 and 4 embodiments are connected to their respective clutch linkages 20 and 20' in the manner illustrated in the FIGS. 1 and 2 embodiments. However, in both the FIGS. 3 and 4 embodiments, the pedal linkages 20 and 20' are not connected directly to links 22" and 22"', in contrast to the FIGS. 1 and 2 embodiments in which the pedal linkages 20 and 20' are connected directly to links 22 and 22'. In the case of the FIG. 3 and 4 embodiments, each includes an arrangement generally indicated at 36 for assisting the driver of the vehicle containing the transmission in disengaging the clutch within housing 12 when the clutch pedal 14 or 14' is depressed. As will be seen below, arrangement 36 includes its own control valve assembly including a valve and valve mounting components In accordance with the present invention, this valve assembly can be used in either the FIG. 3 or FIG. 4 embodiment, that is, in an embodiment which has its linkage in either tension or compression.

Referring specifically to the FIG. 3 embodiment, overall arrangement 36 is shown utilizing a pneumatic piston/cylinder device 38 including a cylinder 40 and piston rod 42, the latter being movable between a biased retracted position within the cylinder and an extended position outside the cylinder. Note that the end of cylinder 40 not including the piston is pivotally connected to a fixed point 43 by suitable pivot means indicated at 44. The free end of the piston/cylinder device is pivotally connected to the otherwise free end of clutch release lever 18 (which is also connected to one end of link 22" and one end of return spring 24). With the piston/cylinder device connected in the manner just described, when the device is actuated so as to cause the piston to move from its retracted position to its extended position, it applies a force to the clutch release lever 18 in a way which causes the lever to move from its clutch engaging position towards its clutch disengaging position. However, in a preferred embodiment, this force is not sufficient by itself to disengage the clutch, but rather combines with the force resulting from the depression of pedal 14 by the driver to disengage the clutch. Thus, as will be seen below, when the driver depresses pedal 14, the piston/cylinder device is simultaneously actuated so that the force provided by the device and the force resulting from the depression of pedal 14 combine to move the clutch release lever sufficient to disengage the clutch.

In addition to pneumatic piston/cylinder device 38, overall arrangement 36 includes a source of air under pressure, indicated generally at 46, and a valve assembly 48 interconnected together with device 38 such that the manual depression of pedal 14 by the driver automatically acts on the valve assembly to cause the latter to connect the air supply to device 38. This, in turn causes the device to move from its retracted position to its extended position simultaneously with the manual depression of the pedal, thereby applying a force to lever 18 to aid the driver of the vehicle in disengaging the clutch. As illustrated in FIG. 3, the valve assembly 48 is connected between air supply 46 and piston/ cylinder device 38 by means of conduits 50 and 52 which also form part of overall arrangement 36.

In the FIG. 3 embodiment just discussed, the piston/cylinder device 38 is connected to push the clutch release lever 18 to the right, as viewed in the Figure and the valve assembly 48 forms part of the linkage arrangement between link 22" and support linkage 20. In the FIG. 4 embodiment, arrangement 36 serves the same purpose as described above with respect to FIG. 3. However, the piston/cylinder device is connected with clutch release lever 18' so as to push the latter to the left instead of pulling it to the right, as illustrated in the Figure. As will be discussed below, while the valve assembly 48 is identical structurally in both the FIGS. 3 and 4 embodiments, they are connected into the linkage arrangement in a different way. In otherwords, while the same overall valve assembly 48 can be used in both the tension mode (the FIG. 3 embodiment) and the compression mode (the FIG. 4 embodiment), the way in which the assembly is interconnected into the rest of the structure requires a slight modification in the positional relationship of its components in order to go from one mode to the other. With the exception of valve assembly 48, the components making up overall arrangement 36 are conventional and readily available. However, the valve assembly is specifically designed in accordance with the present invention so that it can be used in both the tension and compression operating modes.

Turning to FIGS. 5 and 6, attention is directed specifically to valve assembly 48 which is shown including a cylindrical, open ended valve body 54 having a through opening 56 for slidably receiving an elongated, generally cylindrical valve spool 58 which, for reasons to be discussed below, includes opposing internally threaded blind openings 60 and 62. For similar reasons to be discussed, body 54 includes opposite internally threaded blind openings 63 and 65. The spool 58 is slidably mounted within through opening 56 by means of bearings 64. Retainer rings 66 are fixedly connected to opposite ends of the spool for preventing the spool and valve body from separating from one another.

Referring specifically to FIG. 6, the spoool is biased within the valve body in the position illustrated by means of return spring 68 which is disposed around an end section of the spool within a spring providing opening 70. One end of the spring engages a shoulder 72 defined by the housing while the other end rests against a spring retainer ring 74 which is also disposed around the spool between the right hand spring retainer ring 66 and the spring. The spool itself includes an intermediate, axially extending recessed section 76 which cooperates with valve body 54 to define a fluid passing annulus 78. For reasons to be discussed below, a pair of annular spool seals 80 and 82 are fixedly held in place by the valve body around opening 56 and axially spaced relative to one another. As illustrated in FIG. 6, the spool seal 80 engages the left hand larger segment 84 of the spool while the seal 82 projects into annulus 78.

Still referring specifically to FIG. 6, valve body 54 is shown including an air inlet port 86, an air outlet port 88 and an exhaust port 90. Port 86 is connected to previously described air supply 46 via conduit 50 (see FIGS. 3 and 4) and port 88 is connected to piston and cylinder unit 38 via conduit 52 (again, see FIGS. 3 and 4). The exhaust port 90 opens to the ambient surroundings. With spool 58 positioned within valve body 54 in the manner shown, it should be apparent that the inlet port 86 is closed to the outlet port 88 and that the latter is opened to the exhaust port 90 through annnulus 78. As a result, the valve assembly is closed with respect to air supply 46 and valve assembly 38. By moving the spool to the left relative to the valve body or by moving the valve body to the right relative to the spool (to a limited extent), the inlet port 86 may be placed in fluid communication with outlet port 88 through annulus 78 while the exhaust port 90 is closed to both ports. This is because the right hand spool seal 82 engages the right hand spool section 91. Obviously, to provide this relative movement, a force must be applied to either the spool or the valve body or both to overcome the biasing force of spring 68. This is accomplished by actuating foot pedal 14 or 14' discussed previously with respect to FIGS. 3 and 4 respectively. Upon release of the foot pedal, the spool and housing are automatically brought back to the Figure 6 position by means of spring 68.

Still referring to FIG. 6, overall valve assembly 48 also includes an end cap/clevis 92 and a spherical rod end 94 which may or may not require a cooperating jam nut 96. For reasons to be discussed below, it is important to note that the end cap/clevis can be mounted on either end of valve body 54 by means of cooperating cap screws 98 (see FIG. 5) and either threaded blind openings 63 or 65. At the same time, spherical rod end 94 and jam nut 96 can be connected to either end of spool 56 by means of cooperating blind openigns 60 or 62. If it is desirable or necessary to extend the valve assembly, a threaded extension rod 100 and a female spherical rod end 102 (see FIG. 5) may be utilized.

As indicated above, the valve assembly 48 is specifically designed so that it can be used in both the tension and compression mode of the linkage arrangement illustrated in FIG. 3 and 4, respectively. This requires that the positional relationship of the end cap/clevis and spherical rod end (and its associated jam nut) be reversed relative to valve body and spool 56. This is best illustrated in FIGS. 7 and 8. In FIG. 7, the valve assembly is shown connected in the tension mode. The end cap/clevis 92 is mounted to the valve body adjacent return spring 68 while the spherical rod end is connected to the spool at the opposite end. The end cap/clevis is also connected to linkage 20 while the spherical rod end represents link 22", as illustrated in FIG. 3. Thus, when pedal 14 is depressed, the linkage 20 pulls valve body 54 to the right, as indicated by arrow 104 (see FIG. 7). This opens port 86 to port 88, as discussed above.

The valve assembly is converted to one which operates is the compression mode by switching the positions of the end cap/clevis and spherical rod end (and its jam nut) as discussed above. This is illustrated in FIG. 8. Note that the spherical rod end is disposed within the opening 60 adjacent return spring 58 while end cap/clevis 92 is fixedly mounted to the housing at the opposite end of the spool. As illustrated in FIG. 4, the spherical rod end represented as link 22''' is fixedly connected to the clutch release lever 18' while clevis 92 is fixedly connected to linkage 20'. As pedal 14' is depressed, this causes the linkage 20' to push the valve body 54 to the left in FIG. 4 relative to the spool (as indicated by arrow 106 in FIG. 8), thereby placing port 86 in communication with port 88.

Figures 9, 10:
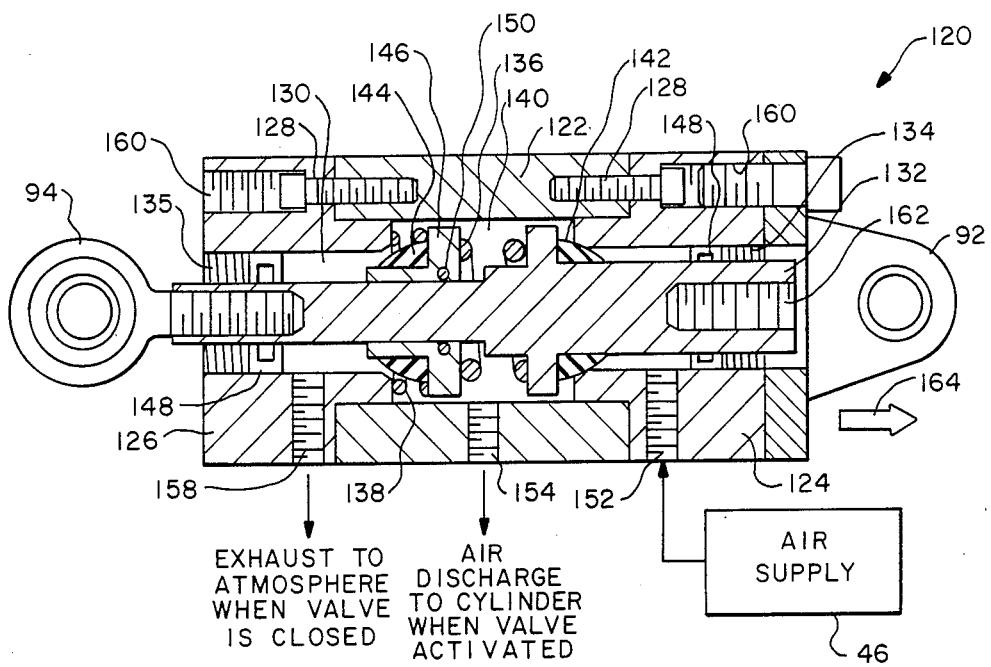
FIGS. 9 and 10 illustrate a modified valve designed in accordance with the present invention for operation in tension and compression modes, respectively.

Referring to FIGS. 9 and 10, a modified valve assembly 120 is shown in its tension and compression modes, respectively. This assembly includes an overall valve body in three sections, a center section 122, and end sections 124 and 126. These valves body sections are fixedly connected to one another by cap screws 128 and cooperated threaded openings. Together the three sections define a through opening 130 for receiving a valve stem 132 slidably supported within the opening by means of annular bearings 134 and 135. The valve stem is biased in the position illustrated in FIGS. 9 and 10 by means of a primary return spring 136 and an exhaust valve return spring 138. The stem 132 is configured so as to define an air flow annulus 140 which functions in a manner to be discussed below. For the same reasons to be discussed, an inlet valve 142 is disposed around the stem in the position shown while an exhaust valve is provided around the stem in a longitudinally spaced manner. A return spring retainer 146 supports the exhuast valve in the manner shown and two valve stem seals 148 fixedly connected with body sections 124 and 126 and slidably engagable with the stem provides seals between the valve body sections and stem. An o-ring 150 provides a seal between return spring retainer 146 and the stem.

Still referring to FIGS. 9 and 10, the valve body sections 124 and 122 are shown including an air inlet port 152 and outlet port 154, respectively, while section 126 is shown including an exhaust port 158. The port 152 connects with air supply 46 via conduit 50 while outlet port 154 connects with piston and cylinder assembly 38 via conduit 52, as illustrated in FIGS. 3 and 4. With the valve assembly in the position shown in either FIGS. 9 or 10, it should be apparent that inlet valve 142 closes the inlet port to the outlet port and thereby closes the air supply to the piston and cylinder assembly. At the same time, outlet port 154 is opened to exhaust port 158. When the valve body is moved to the right relative to the stem or the stem is moved to the left relative to the valve body, inlet valve 142 opens inlet port 152 to outlet port 154, thereby placing the air supply in fluid communication with the piston and cylinder assembly. At the same time, exhuast valve 144 closes the exhuast port 158 to the outlet port 154.

The overall valve assembly 120 also includes the previously described end cap/clevis 92 and spherical rod end 94. At the same time, valve body sections 124 and 126 include threaded openings 160 so that end cap/clevis 92 can be mounted to either end of the valve body. The stem includes opposite threaded openings 162 so that the spherical rod end 94 can be connected to either end of the stem.

The overall valve assembly 120 is shown in FIG. 9 assembled in a tension operating mode with the end cap/clevis being fixedly mountable to pedal linkage 20 while spherical rod end 94 is connected to the clutch release lever 18. In that way, when the pedal 14 is depressed, the valve body is pulled to the right relative to the stem, as indicated by arrow 164, thereby opening port 152 to port 154.

In FIG. 10, the assembly is shown in its compression mode with the spherical rod end being fixedly connectable to clutch release lever 18' while end cap/clevis 94 is fixedly connectable to linkage 20'. In that way, as pedal 14' is depressed, the stem is moved to the left as indicated by arrow 166, thereby opening port 152 to port 154.

What is claimed is:

1. In a vehicle of the type having a manual transmission which includes a clutch, a clutch pedal and a linkage assembly interconnecting the clutch with the pedal and which requires that the drive depress the clutch pedal in order to disengage the clutch, a valve assembly forming part of an overall arrangement including a power device and source of power to assist the driver in disengaging said clutch when the clutch pedal is depressed, said valve assembly comprising:
   (a) a valve including first and second members movable relative to one another between a first opened condition and a second closed condition.
   (b) means for operationally connecting said valve between said power device and source of power so as to connect said source of power with said power device when the valve is in its opened condition; and
   (c) valve mounting means for interconnecting said valve with said linkage assembly such that the manual depression of said pedal by said driver acts on said valve to cause its members to move from said closed condition to said opened condition;
   (d) said valve and valve mounting components being configured such that they form part of said overall arrangement whether said linkage assembly interconnecting the vehicle's clutch with its pedal is placed in tension or compression.

* * * * *